S. JOHNSTON.
COMBINED RAKE AND REEL FOR HARVESTERS.
No. 2,951.
Reissued May 26, 1868.
Fig: 1.
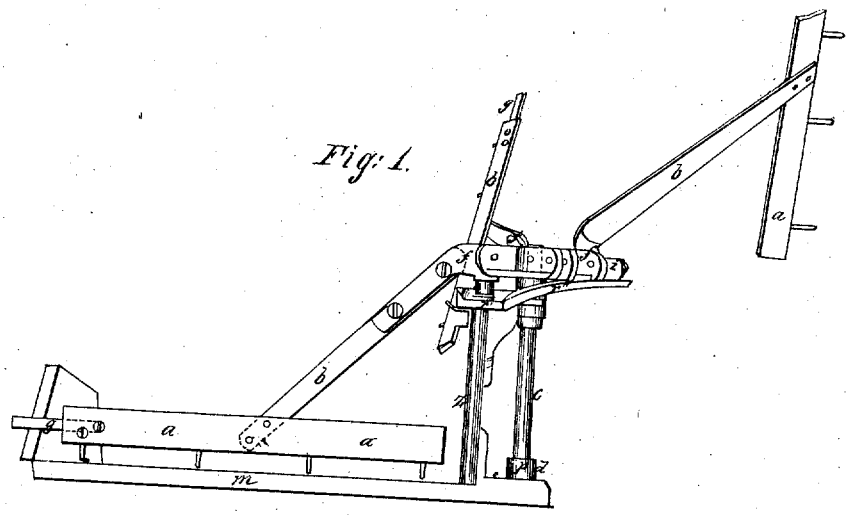
Fig: 2.
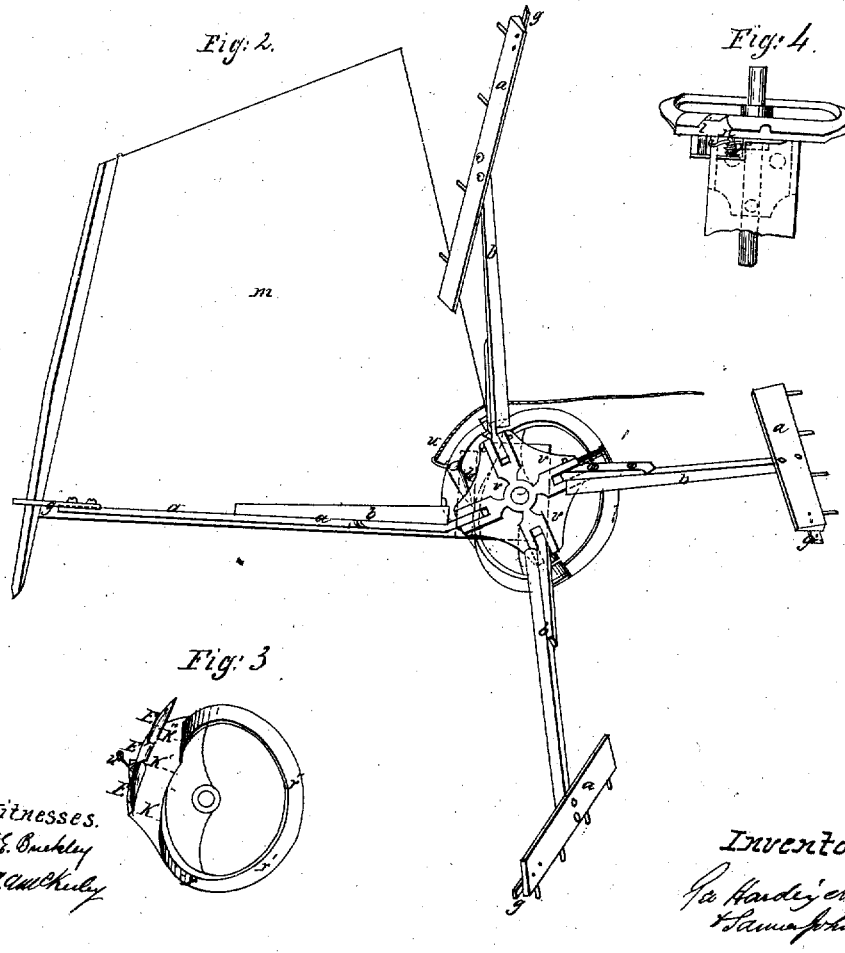
Fig: 4.
Fig: 3
Witnesses.
Geo. E. Buckley
M. A. McKeley
Inventor
Sa Hardy Atty
Samuel Johnston

United States Patent Office.

SAMUEL JOHNSTON, OF BUFFALO, NEW YORK, ASSIGNEE, BY MESNE ASSIGNMENTS, OF HIMSELF.

*Letters Patent No.* 46,300, *dated February* 7, 1865; *reissue No.* 2,951, *dated May* 26, 1868.

IMPROVEMENT IN COMBINED RAKES AND REELS FOR HARVESTERS.

The Schedule referred to in these Letters Patent and making part of the same.

TO ALL WHOM IT MAY CONCERN:

Be it known that I, SAMUEL JOHNSTON, of the city of Buffalo, and State of New York, did invent a new and improved Combined Reel and Self-Rake for Harvesters; and the following is a full and exact description thereof, reference being had to the annexed drawings, making a part hereof, and the letters of reference marked thereon.

The combined revolving rakes and reels heretofore invented by Dorsey, and improved by others, consist essentially of a continuously-revolving rake guided by a cam, so as to descend into the standing grain, and then gather it on to the cutter and platform, and then follow the plane of the platform, discharging the grain in the arc of a circle. Between the intervals of the passage across the platform of this rake, which both gathered and discharged, three heads or beaters passed, which gathered but did not discharge. These were attached to intermediate arms, and revolved upon the same centre, and were guided by the same cam as the rake or head, which both gathered and discharged. As the arms which carried all the gathering-heads, and the head or rake which both gathered and discharged, were guided by one and the same cam, and as that portion of the cam opposite the platform was constructed and adapted primarily to direct the rake, which discharged while crossing the platform, the intermediate heads or rakes, which were intended merely to gather and not discharge, were obliged to be attached to the revolving arms, at such a distance up the said arms that they would not reach the cut grain upon the platform.

While this arrangement was efficient so far as related to the head, which both gathered and discharged, it was a necessary incident that the three intermediate heads which were intended merely to gather could not descend to the same gathering-level as the head which both gathered and discharged. The consequence was that while one head gathered well the other three gathered badly, especially in lodged and tangled grain.

The object of my improvement was first to develope the gathering-capacity of this class of combined rake and reels, as they are called; and this I did by organizing the guiding-cam and the arms for the heads, which merely gather and discharge, so that these heads shall be so attached to the gathering-arms as to descend into the standing grain, to the same gathering-level as the head or teeth thereof, which both gather and discharge, had formerly done, and then, after passing the cutter, those heads were elevated, while passing the platform, by the shape of the cam opposite to the platform, out of the way of the cut grain thereon, while the arm of the head or rake which both gathered and discharged, although it follows the same cam-way as the other three while gathering, does not follow the same cam-way opposite to the platform while passing it, but is independent of that cam-way at that time.

I provide another auxiliary cam-way, especially to guide the arm of the rake or head which both gathers and discharges.

As a result of this improvement, I can cause all my revolving heads to descend into the standing grain, in front of the cutter, to the same gathering-level, which may be as low as or even lower than the level of the cutter, and having thus all effectually and uniformly gathered the grain, and passed over the cutter, in close proximity with it, and cleared it of all clogging matter, those heads which are not to discharge are all elevated at once sufficiently above the cut grain, and so pass over the platform.

It is also manifest that I can put rake-teeth in each of the four heads, and the teeth are of some additional advantage over blank heads on gathering, even though the latter were to descend to the same depth as the level of the points of the rake-teeth; but a main advantage is that I thus obtain four revolving heads, which gather well, and any one of which is susceptible of making a complete discharging-head. And I avail myself of this capacity by making a portion of the cam-way opposite to the platform, which guides the heads which gather but do not discharge, movable, so as to cause the arms of any one or more of those heads which had been passed, as before described, to descend on to the platform and become a discharging-rake by following the auxiliary cam for the time being.

This movable cam-piece may be placed under the control of the driver, on his seat on the machine, by means of a cord, or equivalent connection, and thus the means of regulating the frequency of discharge and the size of the gavel is placed under his control.

The feature of this part of my invention consisting, therefore, in perfecting and rendering uniform the gathering-capacity of all the revolving heads by positively causing the merely gathering-heads to follow a path independent of that pursued by the heads which both gather and discharge while passing the platform, it is evident that other modes of throwing up the heads or teeth above the cut grain on the platform might be used in connection with the cam-arrangement in front of the cutters, and with the heads located upon the arms, as above described, whereby the same result would be attained, although not so efficiently as by the construction of the cam opposite the platform. Such devices might be made movable, also, and might be placed under the control of the driver.

Although an auxiliary cam is shown by me, and is valuable in practice for guiding the rake-head which discharges the grain while passing the platform, this might possibly be dispensed with by permitting the floor of the platform or rim to determine the path of the discharging-rake while passing the platform.

The movable cam-way or device for converting the non-discharging rakes or heads into discharging-rakes or heads is not essential, but is, in my opinion, of importance as varying the size of the gavels, oftentimes very useful to be done.

Minor improvements, hereinafter referred to, are an extension-slat or piece attached to the outer end of each head, so as to overreach and act in combination with the outer divider and rim or fender of the platform in gathering in and discharging the grain.

*z* is a vertical support for the cam. *d* is the hollow bearing in which the shaft revolves. On top of this shaft is a hub or head, to which hub or head the arms *b b b* are pivoted. Each arm has a knee-piece, *f f*, attached to it. These knee-pieces have friction-rollers, *e e e*, and these pass along the cam-ways. The heads *a a a* are attached to these arms, so as to pass in the same level in gathering the grain, which is about the level of the top of the cutters.

The cam-way *r r′ r″* guides the arms, which carry all the heads; both those which gather and do not discharge, and that which both gathers and discharges, while the cam *l l′ l″*, shown in Figure 1, guides the arms of the heads which gather and do not discharge while passing the platform, and the auxiliary cam *k k′ k″* guides the arm which discharges the grain while passing the platform.

The part *l* of the cam-way *l l′ l″* is made movable, and when thrown into the position shown in fig. 1, permits the arm or arms of the rakes to descend to the platform and discharge the grain by following the auxiliary cam for the time being.

By means of the lever *u* and cord attached thereto, and passing to the driver's seat, the movement of this cam is controllable at the will of the driver, and the size of the gavel is by him thus regulated. A spring returns the cam-piece to its place.

A pointed washer, Figure 5, is placed on the bottom of the roller, on the knee-pieces, to prevent the roller from jarring against the head of the movable cam *l′*, if out of position.

An extension-slat, *g*, is attached to the heads or beaters by a screw, so as to reach over the divider and the rim of the platform.

I prefer to attach it by a loose screw, so it can have play enough to enable it to accommodate itself freely to the surface of the divider or rim of the platform, although it is not necessary to attach it loosely, if it be elevated a little at the outer end. Its useful effect is to co-operate with the divider in laying in the grain, clearing off the divider, and co-operate with the rim of the platform in discharging the grain, which rim it also clears off. When loosely attached, a stop should be used to prevent its dropping in front of the cutters.

Having thus described my invention, what I claim, is—

1. In combination with a series of revolving arms carrying heads or rakes which all gather the grain, and a part only of which discharge the grain, I claim so constructing and arranging a cam-way as to cause all the heads or beaters to descend to the same gathering-level in front of the cutters, and then to elevate those which do not discharge above the cut grain on the platform, and above the level pursued by the discharging-head or rake.

2. In combination with a series of revolving arms carrying heads or rakes which all gather the grain, and a part only of which discharge the grain, I claim a cam so arranged as to cause all the heads or beaters to descend to the same gathering-level in front of the cutters, and a device for throwing those heads, or the teeth thereof which do not discharge, above the cut grain while passing the platform, and above the level pursued by the heads, or the teeth thereof, which so discharge the grain.

3. In combination with a series of revolving arms carrying heads or rakes which all gather the grain, and a part only of which discharge the grain, and a cam so arranged as to cause all the heads or beaters to descend to the same gathering-level in front of the cutters, and then to rise above the cut grain on the platform, and the level pursued by the discharging-head, I claim making said cam, or a part thereof, movable, so as to permit any one of said rakes or heads to descend while passing the platform and become a discharging-rake or head.

4. In combination with a series of revolving arms carrying heads or rakes which all gather the grain, and a part only of which discharge the grain, a cam so arranged as to cause all the heads or beaters to descend to the same gathering-level in front of the cutters, and a device for throwing those heads, or the teeth thereof, which do not discharge, above the cut grain while passing the platform and above the level pursued by the heads, or the teeth thereof, which do discharge the grain. I claim making the said last-mentioned device movable, so as to permit any one or more of said heads, or the teeth thereof, to descend to the level of the platform and discharge the grain.

5. In combination with the movable device set forth in the last claim, I claim a cord, or equivalent connection, extending to the driver's seat for operating the said device, so as to regulate the size of the gavel at the will of the driver.

6. In combination with a series of revolving arms carrying heads or rakes which all gather the grain, and a part only of which discharge the grain, and a cam-way so constructed and arranged as to cause all the heads or beaters to descend to the same gathering-level in front of the cutter, and then to elevate those which do not discharge above the cut grain on the platform and above the level pursued by the discharging-head or rake, I claim an auxiliary cam-way for guiding and controlling the arm of the rake or head which discharges the grain while said arm is passing the platform.

7. In combination with a series of revolving arms carrying heads or rakes which all gather the grain, and a part only of which discharge the grain, and a cam so arranged as to cause all the heads or beaters to descend to the same gathering-level in front of the cutters, and a device for throwing those heads, or the teeth thereof, which do not discharge, above the cut grain while passing the platform, and above the level pursued by the heads, or the teeth thereof, which so discharge the grain, I claim an auxiliary cam-way opposite to the platform for guiding and controlling the arm of the rake or head which also discharges the grain.

8. The overhanging extension-attachment to the heads or beaters, in combination with the outer divider and rim of the platform.

9. I claim the combination of the elbow of the rake-arm with the roller and the outer and inner tracks or ways, constructed substantially as described and for the purposes set forth.

SAMUEL JOHNSTON.

Witnesses:

GEO. E. BUCKLEY,

W. A. A. MCKINLEY.